US008121566B2

(12) United States Patent
Ishida et al.

(10) Patent No.: US 8,121,566 B2
(45) Date of Patent: Feb. 21, 2012

(54) BROADCAST RECEIVER AND BROADCAST CHANNEL SEEK METHOD

(75) Inventors: Masanori Ishida, Ageo (JP); Kazuo Koyama, Hasuda (JP); Kazuyoshi Inako, Saitama (JP); Naoki Nakajima, Tokyo (JP)

(73) Assignee: Clarion Co., Ltd, Tokyo (JP)

( * ) Notice: Subject to any disclaimer, the term of this patent is extended or adjusted under 35 U.S.C. 154(b) by 0 days.

(21) Appl. No.: 12/310,614

(22) PCT Filed: Aug. 30, 2007

(86) PCT No.: PCT/JP2007/066901

§ 371 (c)(1),
(2), (4) Date: Apr. 19, 2010

(87) PCT Pub. No.: WO2008/026694

PCT Pub. Date: Mar. 6, 2008

(65) Prior Publication Data

US 2010/0210228 A1 Aug. 19, 2010

(30) Foreign Application Priority Data

Aug. 31, 2006 (JP) ................................ 2006-234960

(51) Int. Cl.
*H04B 1/18* (2006.01)

(52) U.S. Cl. ................ 455/150.1; 455/160.1; 455/154.1

(58) Field of Classification Search ............... 455/150.1, 455/151.1, 154.1, 160.1–179.1, 184.1, 185.1, 455/186.1

See application file for complete search history.

(56) References Cited

U.S. PATENT DOCUMENTS

| | | | | |
|---|---|---|---|---|
| 5,125,105 | A * | 6/1992 | Kennedy et al. | 455/164.1 |
| 6,349,214 | B1 * | 2/2002 | Braun | 455/502 |
| 7,610,011 | B2 * | 10/2009 | Albrett | 455/186.1 |
| 7,869,779 | B2 * | 1/2011 | Walley et al. | 455/161.3 |
| 2004/0235441 | A1 * | 11/2004 | Toporski | 455/150.1 |
| 2007/0010221 | A1 * | 1/2007 | Howard et al. | 455/179.1 |
| 2008/0299925 | A1 * | 12/2008 | Walley et al. | 455/161.1 |
| 2009/0191828 | A1 * | 7/2009 | Ibrahim et al. | 455/150.1 |

FOREIGN PATENT DOCUMENTS

| | | | | |
|---|---|---|---|---|
| EP | 0966120 | | | 12/1999 |
| JP | 10-51271 | A | | 11/1989 |
| JP | 100 51 271 | | | 2/1998 |
| JP | 2001 285032 | | | 10/2001 |
| JP | 2001-285032 | A | | 10/2001 |
| JP | 2001285032 | A | * | 10/2001 |
| JP | 2005-191850 | A | | 7/2005 |
| JP | 2005191850 | | | 7/2005 |
| JP | 2005191850 | A | * | 7/2005 |

* cited by examiner

*Primary Examiner* — Lana N Le
(74) *Attorney, Agent, or Firm* — Day Pitney LLP

(57) ABSTRACT

A broadcasting receiver suitable for receiving broadcasting signal transmitted with signal format is provided in which carrier wave is allocated in a frequency channel with certain frequency offset and signal intensity, which comprises: an information acquiring means for acquiring information related to the frequency channel in seek; and a station existence determining means for determining whether the frequency channel is station-existent or not based on information acquired by the information acquiring means; and wherein, the information acquiring means acquires information for receiving intensity of carrier wave and information for frequency offset.

22 Claims, 6 Drawing Sheets

BROADCAST RECEIVER AND BROADCAST CHANNEL SEEK METHOD

FIELD OF THE INVENTION

Figure 1:
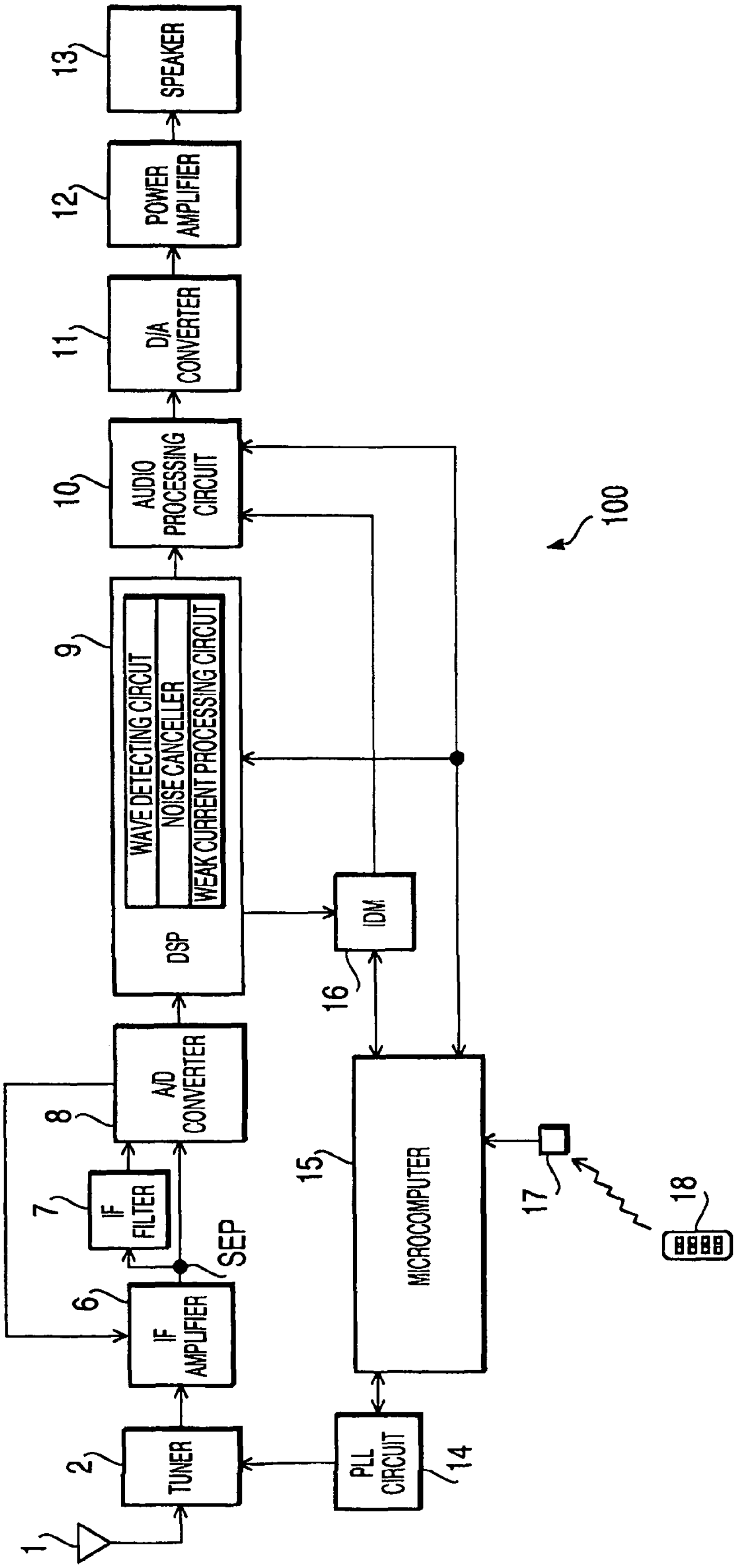

The present invention relates to a broadcasting receiver and a method for seeking broadcasting channel, in particular, to a broadcasting receiver suitable for receiving digital broadcasting, analog broadcasting and digital/analog hybrid broadcasting, and its method for seeking broadcasting channel.

BACKGROUND OF THE ART

Recently, it has become popular to process and manage the sound and video in digital format in appliances such as acoustic appliances and video appliances. Such trends in digital encoding of sound and video in appliances such as acoustic appliances are extending to the field of radio broadcasting. For example, in the United States, a digital radio broadcasting system called IBOC (In Band On Channel) is proposed and made available by iBiquity Digital Corp.

Meanwhile, conventional analog radio broadcasting broadcasts via carrier wave (hereinafter referred to as "analog carrier wave") that has frequency distribution inside the frequency band (hereinafter referred to as "channel" or "frequency channel") assigned to individual broadcasting stations. Actually, in order to avoid the interference between analog carrier wave of adjacent channels, only the center portion of the assigned band is used for the transmission of the analog carrier wave, and other portions are not used. It is noted that "digital radio broadcasting" in this application means "IBOC digital radio broadcasting".

IBOC is a type of digital radio broadcasting that uses a frequency channel assigned to the conventional analog radio broadcasting. In IBOC standard, a plurality of signal formats are defined, such as a hybrid format in which the digital radio broadcasting signal is multiplexed onto the conventional analog radio broadcasting signal, and an all-digital format constituted by only digital signals, and it is designed to gradually transfer from conventional analog radio broadcasting to all-digital radio broadcasting that has many functions and is high in quality. In the IBOC, digital broadcasting signals are transmitted with Orthogonal Frequency Division Multiplexing (OFDM) that uses many carrier waves (subcarriers).

In the IBOC standard, a signal format called "hybrid format" is used in the transition period from analog broadcasting to all-digital broadcasting. In the hybrid format, the digital radio broadcasting, which allocates the subcarrier of digital broadcasting in the portion that is adjacent to the center portion of the band that the analog carrier wave uses and that was not conventionally used (hereinafter referred to as "sideband") is broadcast using the modulated wave of the sideband of the band. In other words, in accordance with the hybrid format of the IBOC, the frequency band assigned for the conventional analog radio broadcasting is utilized effectively, and the analog radio broadcasting and the digital radio broadcasting are simultaneously transmitted using a same channel.

For example, Japanese Patent Provisional Publication No. JP2005-191850A (hereinafter referred to as "the Reference Document") discloses an IBOC broadcasting receiver that is capable of receiving such IBOC digital radio broadcasting. The IBOC broadcasting receiver disclosed in the Reference Document is provided with an automatic seek function for seeking receivable channel.

The IBOC broadcasting receiver starts channel seeking operation when a predetermined user operation (e.g., pressing down once the "Tuning up" or "Tuning down" button equipped at the operation panel.) is performed, and the receiving intensity of the seeking channel is detected. When it is set in a first seek mode, the IBOC broadcasting receiver determines the channel station-existent if the detected receiving intensity is higher than a predetermined amount, and selects the channel, and the channel seeking operation is ceased. Further, when it is set in a second seek mode, the broadcasting receiver performs the decoding process of the digital broadcasting signal along with the channel seeking operation. Then, referring to the result of the process, it determines whether the digital radio broadcasting is performed in the channel. Only when it is determined that the digital radio broadcasting is performed, the channel is selected and the channel seeking operation is ceased. Thereby, the digital radio broadcasting is played.

DISCLOSURE OF THE INVENTION

However, the decoding and determining process is performed not only on the channel where it includes digital broadcasting signal but on the channel where the digital broadcasting is not performed, such as a channel including only the analog broadcasting signal or, a channel determined erroneously as station-existent (i.e., a state where a broadcasting station is found) due to the existence of strong noise, regardless of the fact that it is actually station-non-existent (i.e., a state where a broadcasting station is not found). Since the decoding process on the digital broadcasting is a time-lengthy process, there is a problem that such broadcasting receiver takes long time in the channel seeking operations. Further, in such a broadcasting receiver, it is possible to determine station-existence in a relatively simple arrangement by performing the station-existence determination only by judging presence/absence of a carrier wave of the analog broadcasting signal having a high signal intensity. However, if the station-existence determination is done only with the presence/absence of the carrier wave of the analog broadcasting signal, there is a problem that the frequency channel in which the broadcasting with the all-digital format where the intensity of the carrier wave is week is erroneously determined to be station-non-existent.

Thus, in view of the above circumstances, it is an object of the present invention to provide a broadcasting receiver and a method for seeking broadcasting, which is capable of decreasing the time needed for the channel seeking operation.

In accordance with the embodiment of the invention, a broadcasting receiver suitable for receiving a broadcasting signal transmitted in a signal format is provided in which a carrier wave is allocated in a frequency channel to have a certain frequency offset and a certain signal intensity, which comprises: an information acquiring means for acquiring information related to the frequency channel being sought; and a station existence determining means for determining whether the frequency channel is in a state of station-existent or not based on information acquired by the information acquiring means; and wherein the information acquiring means acquires information concerning a receiving intensity of carrier wave and information concerning a frequency offset.

With such an arrangement, the broadcasting receiver is capable of acquiring necessary information for determining whether the receivable digital broadcasting is performed or not in advance of performing the decoding of the digital broadcasting signal. Therefore, the decoding process of the digital broadcasting signal may be performed only when it is likely that the digital broadcasting is performed in the frequency channel in seek. By operating such that above time-lengthy decoding process is not performed on the channel in which digital broadcasting is not performed, it is enabled to decrease the time needed for the channel seeking operation. Further, since the information for the receiving intensity and the frequency offset for the carrier wave is acquired, it is enabled to determine the existence of the subcarrier for the digital broadcasting signal from those relations, and to determine accurately the broadcasting signal in all-digital format as station-existent also.

In addition, the broadcasting receiver may comprise an analog determining means for determining whether the carrier wave of the analog broadcasting signal is included in the frequency channel or not, based on the information acquired by the information acquiring means.

With such an arrangement, it is enabled to determine the existence of the carrier wave for analog broadcasting signal, which is important information useful for determining whether transmission of the broadcasting signal in all-digital format is performed or not in the frequency channel.

Additionally, the broadcasting receiver may comprise a digital determining means for determining whether carrier wave of the digital broadcasting signal is included in the frequency channel or not, based on the information acquired by the information acquiring means.

With such an arrangement, it is enabled to determine whether the digital broadcasting is performed in the frequency channel or not without decoding the digital broadcasting signal, which is a time-lengthy process.

Further, the broadcasting receiver may comprise a difference calculating means for calculating difference between a maximum value and a minimum value of the frequency offset of the carrier wave included in the frequency channel based on the information of frequency offset acquired by the information acquiring means; and an all-digital determining means for determining whether the broadcasting signal in the all-digital format that is signal format including only the carrier wave of the digital broadcasting signal is transmitted in the frequency channel or not. In this case, the all-digital determining means may determine that the broadcasting signal in all-digital format is transmitted in the frequency channel, when the station existence determining means determines that the frequency channel is in the state of station-existent, the analog determining means determines that the frequency channel does not include the carrier wave of the analog broadcasting signal, and the difference calculated by the difference calculating means is larger than or equal to a certain value. Furthermore, the difference calculating means may perform calculation of the difference when the station existence determining means determines that the frequency channel is in the state of station-existent, and the analog determining means determines that the frequency channel does not include the carrier wave of the analog broadcasting signal.

With such an arrangement, it is enabled to distinguish between broadcasting in hybrid format where analog signal and digital signal co-exists and broadcasting in all-digital format.

Further, the broadcasting receiver may comprise a decoding means for decoding the digital broadcasting signal; and an all-digital ascertaining means for ascertaining that the broadcasting signal in the all-digital digital format is transmitted in the frequency channel, based on the result of the decoding process by the decoding means. In this case, in the channel seek, the decoding process may be performed by the decoding means only when the all-digital determining means determines that the broadcasting signal in the all-digital format is transmitted in the frequency channel.

The receiver arranged as such performs the decoding process of the digital signal, which obstruct the smooth channel seeking operation due to long time required for the processing, only in the frequency channel that was determined in advance that the transmission of the broadcasting signal in all-digital format, which requires decoding process in channel seek, is performed. Therefore, fluent channel seeking is made possible. Further, it does not output the disturbing digital noise made due to analog demodulation, in a case with all-digital format, and the channel seeking is performed in comfort.

In accordance with the embodiment of the invention, a method for performing channel seek for a frequency channel is provided, wherein a broadcasting signal in a signal format in which a carrier wave of an analog broadcasting signal and/or a digital broadcasting signal is allocated to have a certain frequency offset and a signal intensity is transmitted in the frequency channel, the method comprising: an information acquiring step for acquiring information related to the frequency channel being sought; and a station existence determining step for determining whether the frequency channel is in a state of station-existent or not based on the information acquired in the information acquiring step; and wherein, in the information acquiring step, information concerning a receiving intensity of carrier wave and information concerning a frequency offset are acquired.

BRIEF DESCRIPTION OF ACCOMPANYING DRAWINGS

FIG. 1 A block diagram showing an arrangement of an audio apparatus comprising an IBOC broadcasting receiver according to an embodiment of the invention.

Figure 2:
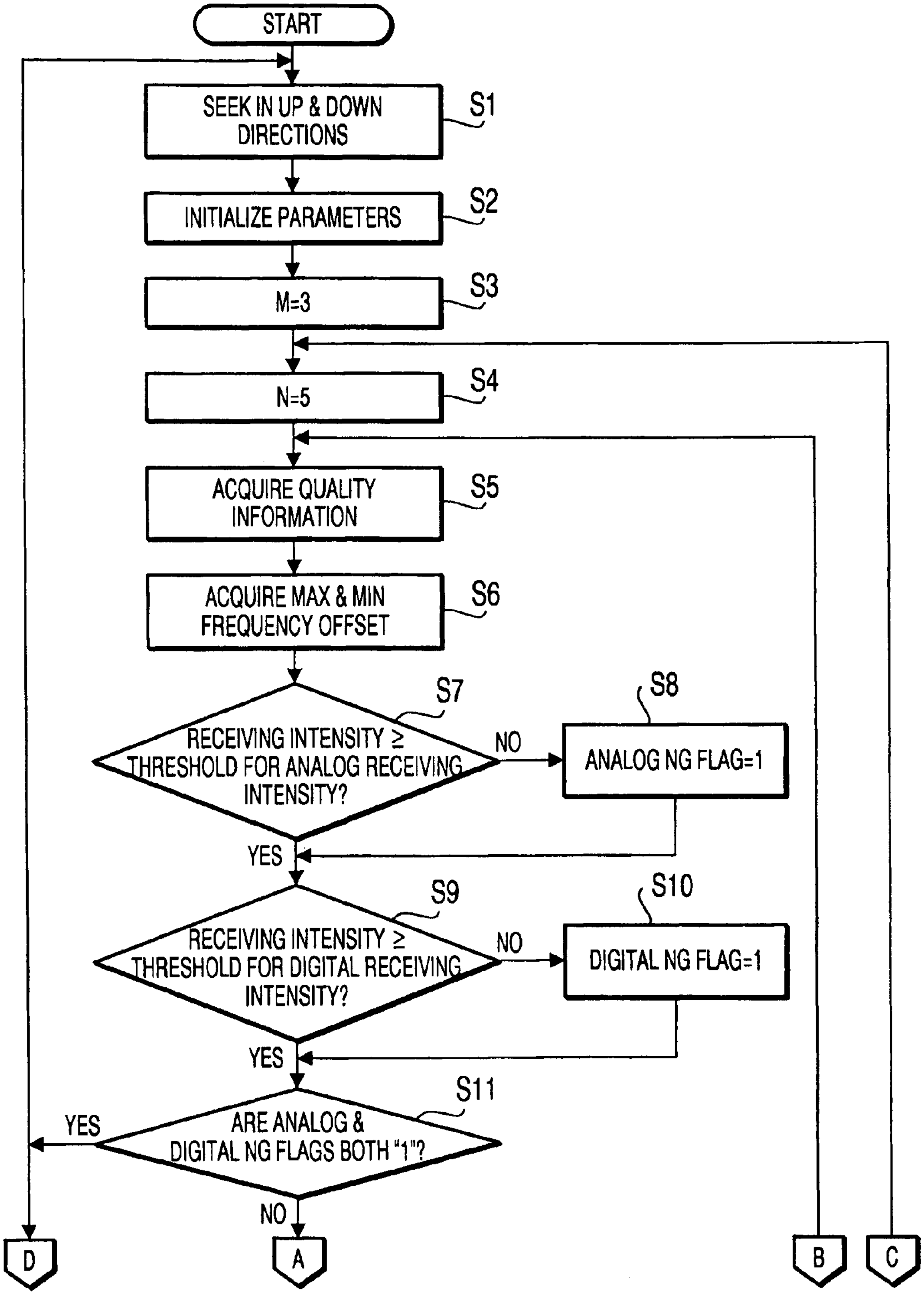

FIG. 2 A flowchart describing channel seeking process performed in the audio apparatus according to the embodiment of the invention.

Figure 3:
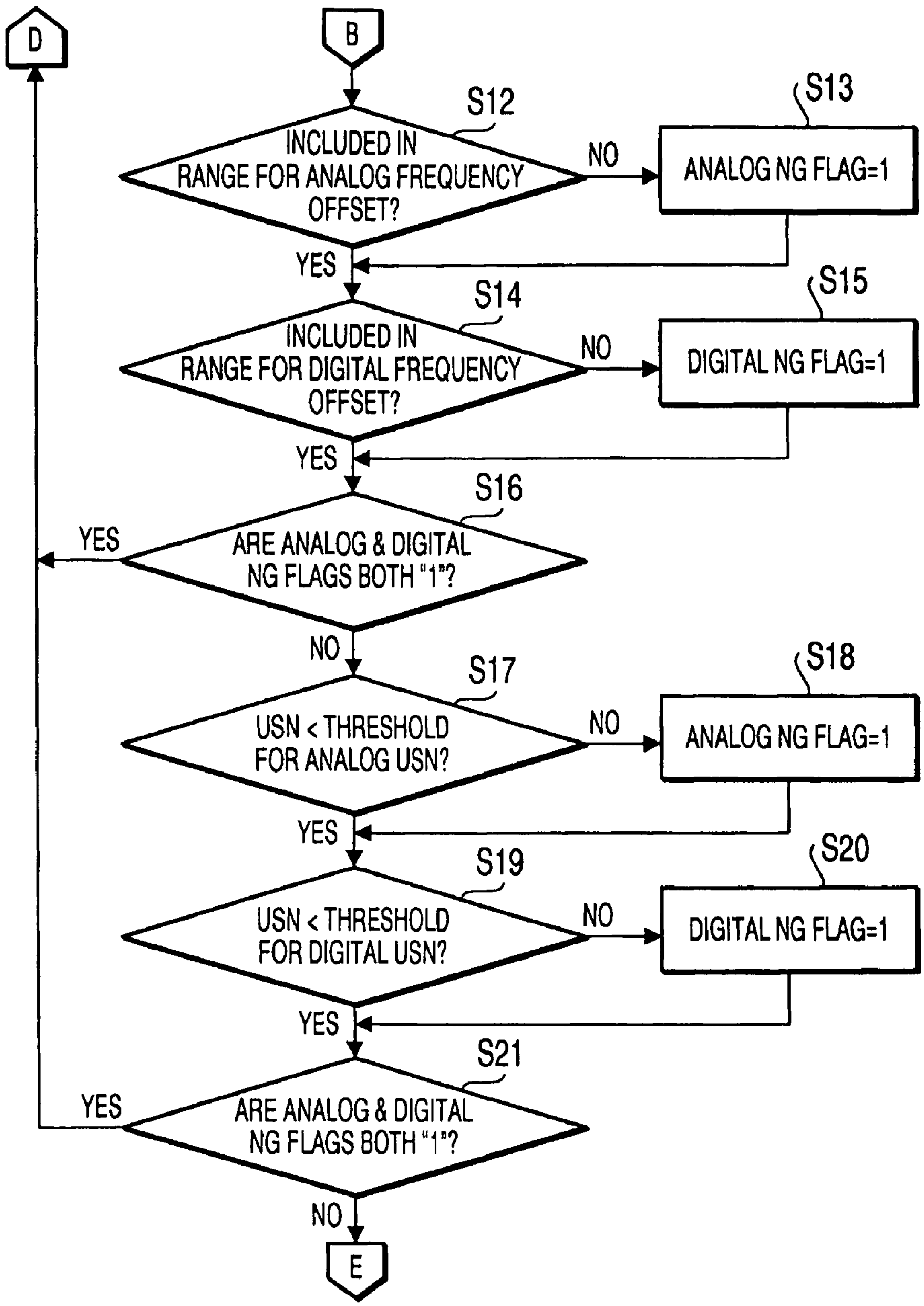

FIG. 3 A flowchart describing channel seeking process performed in the audio apparatus according to the embodiment of the invention.

Figure 4:
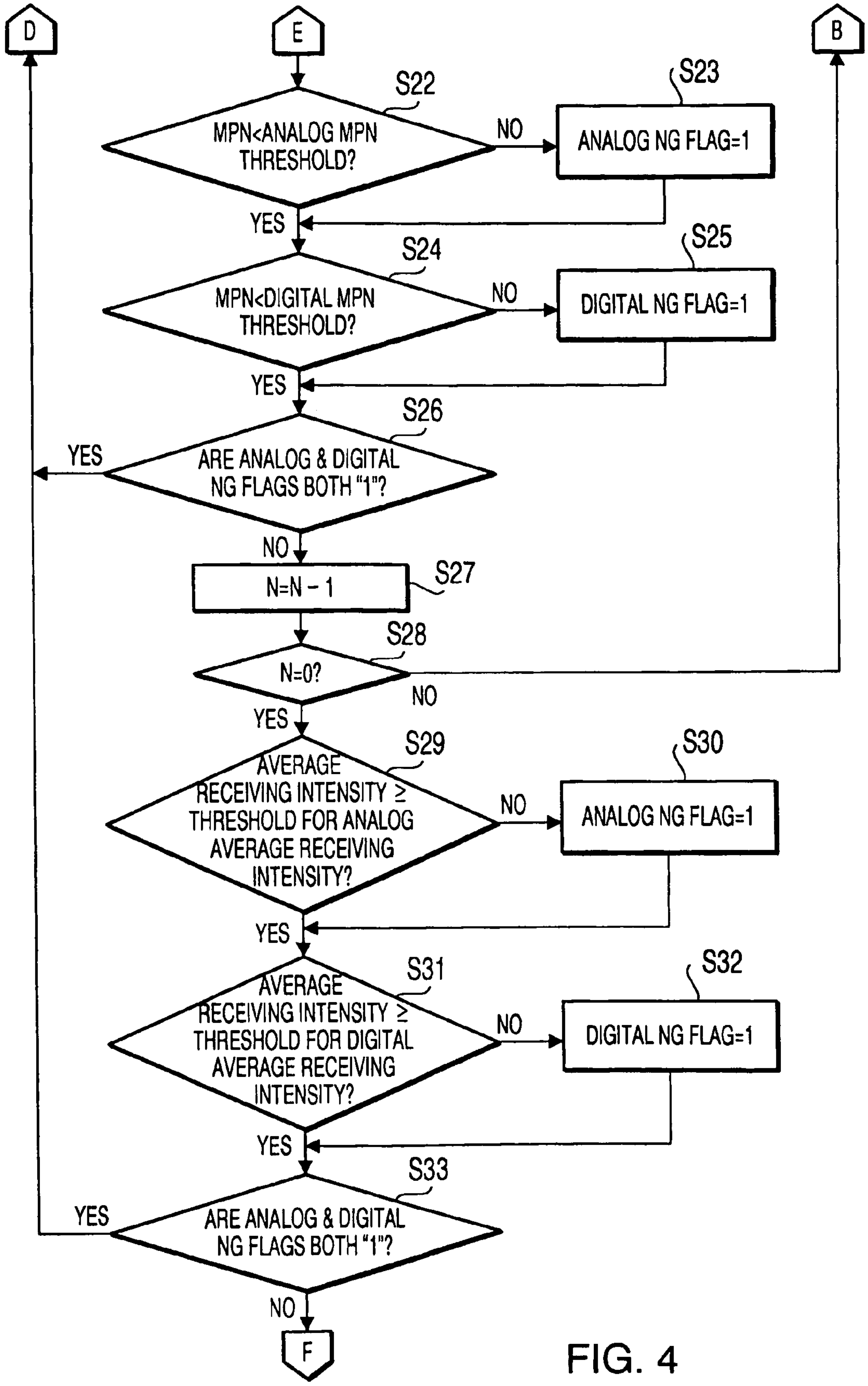

FIG. 4 A flowchart describing channel seeking process performed in the audio apparatus according to the embodiment of the invention.

Figure 5:
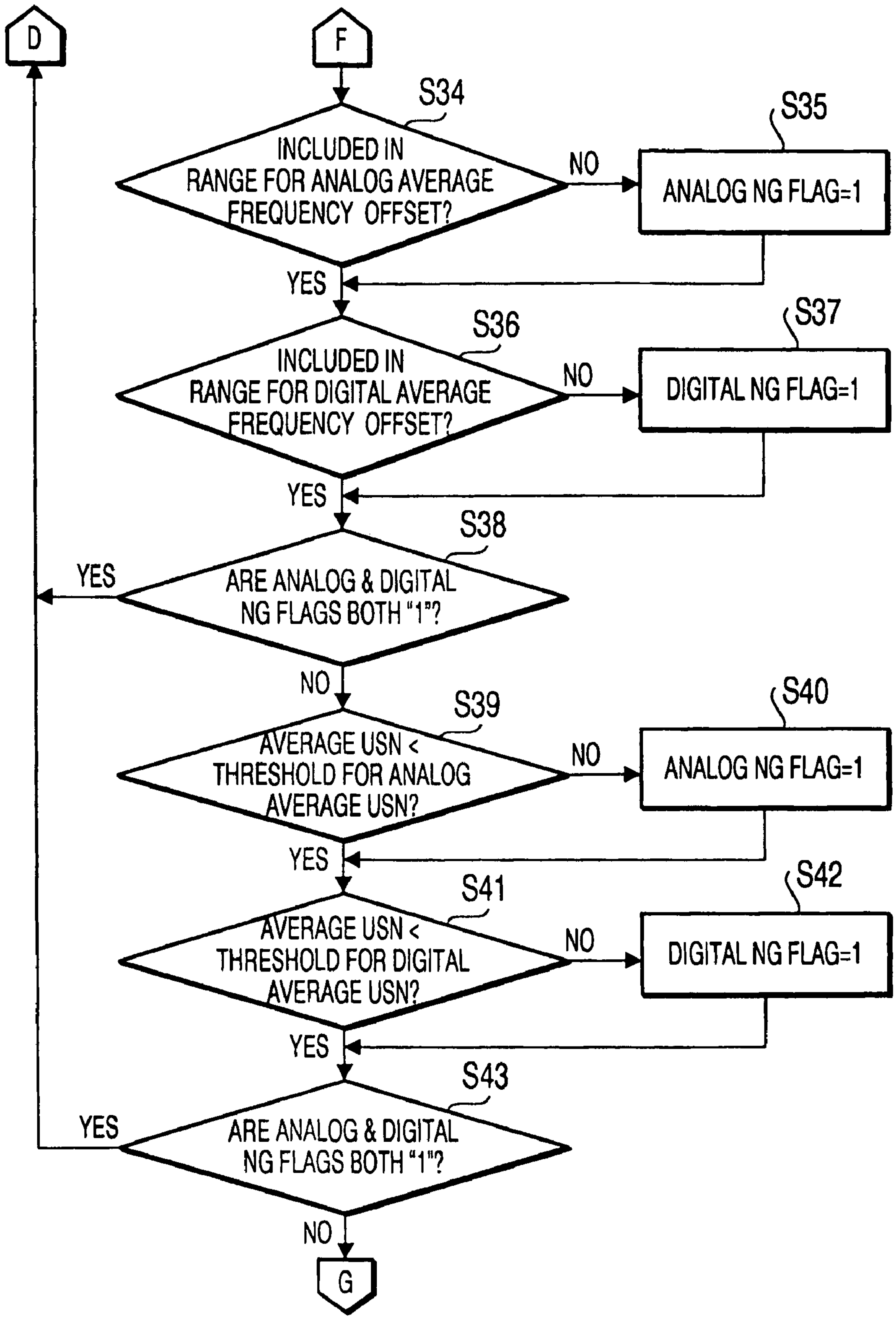

FIG. 5 A flowchart describing channel seeking process performed in the audio apparatus according to the embodiment of the invention.

Figure 6:
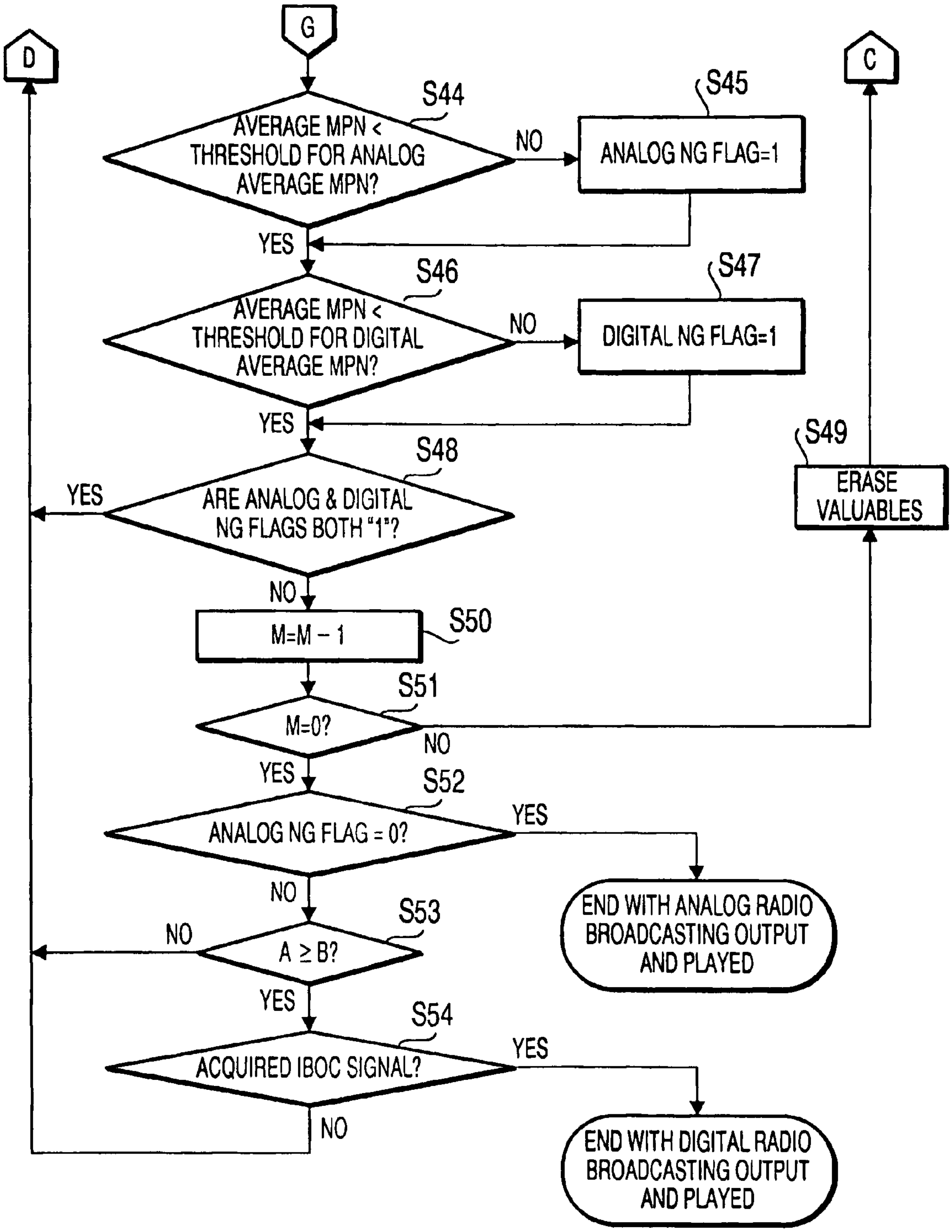

FIG. 6 A flowchart describing channel seeking process performed in the audio apparatus according to the embodiment of the invention.

DETAILED DESCRIPTION OF PREFERRED EMBODIMENTS

In the following, an IBOC broadcasting receiver according an embodiment of the invention will be described referring to the drawings.

FIG. 1 is a block diagram illustrating an arrangement of an audio apparatus 100 including an IBOC broadcasting receiver according to an embodiment of the present invention. The audio apparatus 100 is mounted in, for example, a mobile vehicle. The audio apparatus 100 complies with IBOC radio broadcasting, and is designed to receive and process broadcasting signal in IBOC signal format.

The audio apparatus 100 includes an antenna 1, a tuner 2, an IF (Intermediate Frequency) amplifier 6, a separator SEP, an IF filter 7, an A/D converter 8, an DSP (Digital Signal Processor) 9, an audio processing circuit 10, a D/A converter 11, a power amplifier 12, a speaker 13, a PLL (Phase Locked Loop) circuit 14, a microcomputer 15, an IDM (IBOC Digital Module) 16, an optical receiver 17, and a remote controller 18.

The remote controller 18 is provided with operation keys for operating the audio apparatus 100. When the user operates the remote controller 18, a control pulse associated with the operation is output from the remote controller 18. Such control pulse output is, for example, a signal that complies with the IrDA standard. After the optical receiver 17 receives the control pulse that the remote controller 18 outputted, then passes it to the microcomputer 15.

The microcomputer 15 governs the general control of the overall audio apparatus 100. It executes those control programs based on the control pulse received from the optical receiver 17, and controls elements within the audio apparatus 100.

In the following, a series of signal processing in the audio apparatus 100 will be described. The antenna 1 receives RF (Radio Frequency) signal for channels of the radio broadcast. RF signal received on the antenna 1 is input to the tuner 2.

The tuner 2 performs the frequency conversion into an intermediate frequency suitable for signal processing of filtering, etc., by selecting the RF signal of the selected channel among the input RF signals with the control carried out by the microcomputer 15 with the PLL circuit 14. The IF signal acquired by the frequency conversion of the RF signal is input to the IF amplifier 6. The selected channel is determined according to, for example, the station selecting operation with the user operation. The information regarding the last selected channel (hereinafter referred to as "last channel") is, for example, held in the internal memory or a flash ROM (not shown) of the microcomputer 15.

The IF amplifier 6 amplifies the input IF signal and outputs to the separator SEP. The separator SEP separates the input IF signal into two signal components based on, for example, the frequency. One of the separated components is a signal component obtained by converting the analog carrier wave into the IF signal (hereinafter, it is referred to as, "analog IF signal"), and the other one is a signal component obtained by converting the sideband subcarrier into the IF signal (hereinafter referred to as "digital IF signal") The separator SEP outputs the separated analog IF signal and the digital IF signal to the IF filter 7 and the A/D converter 8, respectively.

If only the analog radio broadcasting is transmitted in the selecting channel, substantially only the analog IF signal is input to the separator SEP. Therefore, the digital IF signal will not be obtained even if the separation process is performed at the separator SEP. In contrast, if only the digital radio broadcasting is transmitted in the selecting channel, substantially only the digital IF signal is input to the separator SEP. Therefore, the analog IF signal will not be obtained even if the separation process is performed at the separator SEP.

The IF filter 7 performs the filtering process that removes the unneeded frequency component from the input analog IF signal, and outputs the processed analog IF signal to the A/D converter 8. The A/D converter 8 is provided with different A/D conversion processing circuits individually for analog IF signal and for digital IF signal. Then, the input analog and digital IF signal is A/D converted by the corresponding A/D conversion processing circuit, and is output to the DSP 9. It is noted that the gain of the IF amplifier 6 is adjusted with the feedback control based on the level of the IF signal input to the A/D converter 8.

The DSP 9 comprises a separator that separates the input IF signal into two signal components (analog IF signal and digital IF signal), based on, for example, frequency. Further, the DSP 9 comprises a wave detecting circuit, a noise canceller and a weak electric field processing circuit for demodulating the separated analog IF signal.

The DSP 9 outputs the separated analog IF signal to the wave detecting circuit, and also, outputs the digital IF signal to the IDM 16.

The analog IF signal is demodulated to the audio signal by the wave detecting circuit, and then removed the noise by the noise canceller. After removing the noise, processing according to the receiving condition of the selecting channel (e.g., mute, high cut, separation control) is performed onto the signal by the weak electric field processing circuit. Then, the DSP 9 outputs the signal that underwent these series of processes to the audio processing circuit 10 as the analog audio signal.

It is noted that the DSP 9 does not perform the separation process by the separator if the channel seeking process, which will be described later, is being performed. Therefore, the input IF signal undergoes the wave detecting process, the noise removing process and the process by the weak electric field processing circuit. By means of these series of processes, the quality information for the checking channel is acquired. The quality information includes information such as the receiving intensity of the carrier wave for the checking channel, the offset value from the center frequency of the channel (hereinafter referred to as "frequency offset"), information showing the multipath noise (hereinafter referred to as "MPN"), information showing the adjacent disturbance, which is noise due to the signal in the adjacent channel (hereinafter it is referred to as "USN"). The obtained quality information is passed onto the microcomputer 15.

The IDM 16 is a decoder for digital broadcasting signal for use only for IBOC. The IDM 16 performs a well-known decoding process to the input digital IF signal and acquires audio signal. Then, the acquired audio signal is output to the audio processing circuit 10. For the purpose of description, the audio signal that underwent the IDM 16 process and was output is described as, "digital audio signal".

Subsequently, the audio processing circuit 10 performs a predetermined process onto the input audio signal and inputs it to the D/A converter after adjusting the volume.

The D/A converter 11 performs a digital-to-analog conversion to the input audio signal and outputs to the power amplifier 12. The power amplifier 12 amplifies the audio signal and outputs to the speaker 13. Thereby, the radio broadcast is output and played at the speaker 13. It is noted that the audio processing circuit 10 is implemented with a blend circuit that smoothly switches between the input analog audio signal and digital audio signal and outputs either one of them. With the blend circuit, when the output signal is switched from analog audio signal to digital audio signal (or alternatively, from digital audio signal to analog audio signal), the sound output from the speaker 13 is coupled naturally so that the user does not sense the switch occurred.

In the following, the channel seeking process related to the audio apparatus 100 of the present embodiment is described. FIGS. 2-6 indicate the flowcharts that describe the channel seeking process performed by the audio apparatus 100. The channel seeking process, which is described in FIGS. 2-6, starts when the user performs tuning up (or tuning down) operation (For example, pressing down once the "Tuning up" or "Tuning down" button) while the audio apparatus 100 is selecting some channel.

When the channel seeking process of the present embodiment starts, the microcomputer 15 performs the channel seeking operation in the direction corresponding to the user operation (Up or Down direction) (Step 1. Hereinafter, the term "step" is abbreviated as next is searched by raising (or lowering) the frequency band for which the seeking operation is done.

Subsequently, the microcomputer 15 initializes the parameters related to each channel (S2). The parameters that are initialized include "Analog NG flag", "Digital NG flag", "maximum frequency offset" and "minimum frequency offset".

"Analog NG flag" is the information that indicates whether it can receive the analog radio broadcasting or not. "Digital NG flag" is the information that indicates whether it can receive the digital radio broadcasting or not. Flag value "0" indicates that it is able to receive the broadcasting corresponding to the flag. Flag value "1" indicates that it is not able to receive the broadcasting corresponding to the flag.

"Maximum frequency offset" indicates the largest offset value among the frequency offsets that can be obtained by DSP 9. "Minimum frequency offset" indicates the smallest offset value among the frequency offsets that can be obtained by DSP 9. Frequency offset is the parameter that indicates the difference between the frequency of carrier wave having an amplitude which is larger than the prescribed reference and the central frequency of the channel. The microcomputer 15 sets each frequency offset to "0" in the S2 process.

When the frequency band for which seeking operation is performed is the channel on which digital radio broadcasting is being done, multiple frequency offsets can be obtained by DSP 9. In this case, these frequency offsets indicate the offset value for each subcarrier of the digital radio broadcasting. "Maximum frequency offset" becomes the offset value for the subcarrier that is farthest on the plus side (direction in which frequency is high) from the center of the frequency band for which seek is performed. "Minimum frequency offset" is the offset value of the subcarrier that is farthest on the minus side (direction in which frequency is low) from the center.

After the S2 process, the microcomputer 15 sets the count value M of the internal counter to "3" (S3). Further, count value N of a different internal counter is set to "5" (S4). After these count values are set, the microcomputer 15 receives the quality information, which was obtained by the process corresponding to the frequency band for which seeking operation is performed, from DSP 9 and maintains it in the internal memory (S5). Every time the quality information is obtained by the execution of the S5 process, the microcomputer 15 stores the information in the internal memory. In other words, if the S5 process is performed twice, acquired quality information by the first and second S5 process is stored in the internal memory. Hereinafter, for the purpose of description, the quality information acquired by the S5 process is referred to as "acquired quality information".

After the S5 process, the microcomputer 15 maintains the maximum value of the frequency offset (included in the acquired quality information) as "maximum frequency offset" and the minimum value as "minimum frequency offset" (S6). When execution of the step S6 is the second time or later, the corresponding value is already held in the "maximum frequency offset" and "minimum frequency offset". In this case, the frequency offset that is newly obtained is compared with the frequency offset that is held. If the value that is newly obtained is the largest, the "maximum frequency offset" is updated and if it is the smallest, the "minimum frequency offset" is updated.

After the S6 process, the microcomputer 15 determines whether the receiving intensity included in the acquired quality information is greater than or equal to the threshold value (hereinafter referred to as "threshold value for the analog receiving intensity") corresponding to the receiving intensity of the analog radio broadcasting that is set in advance (S7). If the receiving intensity is determined to be greater than or equal to the threshold value for the analog receiving intensity (S7: YES), the microcomputer 15 determines the receiving intensity to be high enough to receive the analog radio broadcasting and proceeds to the S9 process. On the other hand, when the receiving intensity is determined to be smaller than the threshold value for the analog receiving intensity (S7: NO), the microcomputer 15 determines that the analog radio broadcasting cannot be received as the receiving intensity is low. In this case, the "analog NG flag" is set to "1" (S8) and the process proceeds to S9.

In the S9 process, the microcomputer 15 determines whether the receiving intensity included in the acquired quality information is greater than or equal to the threshold value (hereinafter referred to as "threshold value for the digital receiving intensity") corresponding to the receiving intensity of the digital radio broadcasting that is set in advance. When the receiving intensity is determined to be greater than or equal to the threshold value for the digital receiving intensity (S9: YES), the microcomputer 15 determines the receiving intensity to be high enough to receive the digital radio broadcasting and proceeds to the S11 process. On the other hand, when the receiving intensity is determined to be smaller than the threshold value for the digital receiving intensity (S9: NO), the microcomputer 15 determines that the digital radio broadcasting cannot be received as the receiving intensity is low. In this case, the "analog NG flag" is set to "1" (S10) and the process proceeds to S11.

In the S11 process, the microcomputer 15 refers to the "analog NG flag" and "digital NG flag". When both of these flags are "1" (S11: YES), it is determined that neither the analog radio broadcasting nor the digital radio broadcasting can be received. In this case, the process returns to S1 and process is performed for the frequency band for which seek is performed. On the other hand, if at least one of these flags is "0" (S11: NO), the microcomputer 15 determines that at least one radio broadcasting can be received and the process proceeds to S12.

In the S12 process, the microcomputer 15 determines whether the frequency offset included in the acquired quality information lies within the range (hereinafter referred to as "range for the analog frequency offset") that is set for the analog radio broadcasting frequency offset. When it is determined to lie within the range for the analog frequency offset (S12: YES); the microcomputer 15 determines that it is able to receive the analog radio broadcasting since the noise influence is low, and the process proceeds to S14. On the other hand, when the frequency offset is determined to be outside the range of analog frequency offset (S12: NO), the microcomputer 15 determines that is not possible to receive the analog radio broadcasting as the noise influence is more. It then proceeds to the S14 process after setting the "analog NG flag" to "1" (S13).

In the S14 process, the microcomputer 15 determines whether the frequency offset included in the acquired quality information lies within the range (hereinafter referred to as "range for the digital frequency offset") that is set for the digital radio broadcasting frequency offset. When it is determined to lie within the range for the digital frequency offset (S14: YES), the microcomputer 15 determines that is possible to receive the digital radio broadcasting since the noise influence is low. The process thereafter proceeds to S16. On the other hand, when the frequency offset is determined to be outside the range of digital frequency offset (S14: NO), the microcomputer 15 determines that is not possible to receive the digital radio broadcasting as the noise influence is more. It then proceeds to the S16 process after setting the "digital NG flag" to "1" (S15).

Similar to the S11 process, in the S16 process too, the microcomputer 15 refers to the "analog NG flag" and "digital NG flag". When both of these flags are "1" (S16: YES), the microcomputer 15 determines that neither the analog radio broadcasting nor the digital radio broadcasting can be received. In this case, the process returns to S1 and starts the process for the frequency band for the next seeking operation. On the other hand, if at least one of these flags is "0" (S16: NO), the microcomputer 15 determines that at least one radio broadcasting can be received and the process proceeds to S17.

In the S17 process, the microcomputer 15 determines whether USN included in the acquired quality information is smaller than the threshold value (hereinafter referred to as "threshold value for the analog USN") corresponding to the USN of the analog radio broadcasting that is set in advance. When the USN included in the acquired quality information is determined to be smaller than the threshold value for the analog USN (S17: YES), the microcomputer 15 determines that the analog radio broadcasting can be received as the influence of adjacent disturbance is low and the process proceeds to S19. On the other hand, when it is determined to be greater than or equal to the threshold value for the analog USN (S17: NO), the microcomputer 15 determines that the analog radio broadcasting cannot be received as the influence of adjacent disturbance is high and the process proceeds to S19 after setting (S18) the "analog NG flag" to "1".

In the S19 process, the microcomputer 15 determines whether USN included in the acquired quality information is smaller than the threshold value (hereinafter referred to as "threshold value for the digital USN") corresponding to the USN of the digital radio broadcasting that is set in advance. When the USN included in the acquired quality information is determined to be smaller than the threshold value for the digital USN (S19: YES), the microcomputer 15 determines that the digital radio broadcasting can be received as the influence of adjacent disturbance is low and the process proceeds to S19. On the other hand, when it is determined to be greater than or equal to the threshold value for the digital USN (S19: NO), the microcomputer 15 determines that the digital radio broadcasting cannot be received as the influence of adjacent disturbance is high and the process proceeds to S21 after setting the "digital NG flag" to "1" (S20).

Similar to the S11 process, in the S21 process too, the microcomputer 15 refers to the "analog NG flag" and "digital NG flag". When both of these flags are "1" (S21: YES), the microcomputer 15 determines that neither the analog radio broadcasting nor the digital radio broadcasting can be received. In this case, the process returns to S1 and the process for the frequency band for the next seeking operation is performed. On the other hand, if at least one of these flags is "0" (S21: NO), the microcomputer 15 determines that at least one radio broadcasting can be received and the process proceeds to S22.

In the S22 process, the microcomputer 15 determines whether MPN included in the acquired quality information is smaller than the threshold value (hereinafter referred to as "threshold value for the analog MPN") corresponding to the MPN of the analog radio broadcasting that is set in advance. When the MPN included in the acquired quality information is determined to be smaller than the threshold value for the analog MPN (S22: YES), the microcomputer 15 determines that the analog radio broadcasting can be received as the influence of multipath noise is low and the process then proceeds to S24. On the other hand, when it is determined to be greater than or equal to the threshold value for the analog MPN (S22: NO), the microcomputer 15 determines that the analog radio broadcasting cannot be received as the influence of multipath noise is high and the process then proceeds to S24 after setting the "analog NG flag" to "1" (S23).

In the S24 process, the microcomputer 15 determines whether MPN included in the acquired quality information is smaller than the threshold value (hereinafter referred to as "threshold value for the digital MPN") corresponding to the MPN of the digital radio broadcasting that is set in advance. When the MPN included in the acquired quality information is determined to be smaller than the threshold value for the digital MPN (S24: YES), the microcomputer 15 determines that the digital radio broadcasting can be received as the influence of multipath noise is low and the process then proceeds to S26. On the other hand, when it is determined to be greater than or equal to the threshold value for the digital MPN (S24: NO), the microcomputer 15 determines that the digital radio broadcasting cannot be received as the influence of multipath noise is high and the process then proceeds to S26 after setting the "digital NG flag" to "1" (S25).

Similar to the S11 process, in the S26 process too, the microcomputer 15 refers to the "analog NG flag" and "digital NG flag". When both of these flags are "1" (S26: YES), the microcomputer 15 determines that neither the analog radio broadcasting nor the digital radio broadcasting can be received. In this case, the process returns to S1 and the process for the frequency band for the next seeking operation is performed. On the other hand, if at least one of these flags is "0" (S26: NO), the microcomputer 15 determines that at least one radio broadcasting can be received and the process proceeds to S27.

In the S27 process, the microcomputer 15 decrements the count value N by 1 and then determines whether the count value N is "0" (S28). If the count value N is determined to be "0" (S28: YES), the microcomputer 15 determines that the Steps 5-27 processes has been repeated N times and proceeds to the S29 process. On the other hand, if the count value N is not "0" (S28: NO), the microcomputer 15 determines that the Steps 5-27 processes has not been performed N times and returns to the S5 process.

In the S29 process, the microcomputer 15 calculates the average value of receiving intensity for the N batches stored in the internal memory. After that, the microcomputer 15 determines whether the average value (hereinafter referred to as the "average receiving intensity") of the calculated receiving intensity is greater than or equal to the threshold value (hereinafter referred to as the "threshold value for analog average receiving intensity") corresponding to the average receiving intensity of the analog radio broadcasting set in advance. If the value is greater than or equal to the threshold value for analog average receiving intensity (S29: YES), the microcomputer 15 determines that the analog radio broadcasting can be received stably as the receiving intensity is continuously high. The process thereafter proceeds to S31. On the other hand, if the value is smaller than the threshold value for analog average receiving intensity (S29: NO), the microcomputer 15 determines that the analog radio broadcasting cannot be received as the receiving intensity is unstable. In this case, the "analog NG flag" is set to "1" (S30) and the process proceeds to S31.

In the S31 process, the microcomputer 15 determines whether the average receiving intensity is greater than or equal to the threshold value (hereinafter referred to as the "threshold value for digital average receiving intensity") corresponding to the average receiving intensity of the digital radio broadcasting set in advance. If the intensity is greater than or equal to the threshold value for digital average receiving intensity (S31: YES), the microcomputer 15 determines that the digital radio broadcasting can be received stably as the receiving intensity is continuously high. The process thereafter proceeds to S33. On the other hand, if the intensity is smaller than the threshold value for digital average receiving intensity (S31: NO), the microcomputer 15 determines that the digital radio broadcasting cannot be received as the receiving intensity is unstable. In this case, the "digital NG flag" is set to "1" (S32) and the process proceeds to S33.

Similar to the S11 process, in the S33 process too, the microcomputer 15 refers to the "analog NG flag" and "digital NG flag". When both of these flags are "1" (S33: YES), the microcomputer 15 determines that neither the analog radio broadcasting nor the digital radio broadcasting can be received. In this case, the process returns to S1 and the process for the frequency band for the next seeking operation is performed. On the other hand, if at least one of these flags is "0" (S33: NO), the microcomputer 15 determines that at least one radio broadcasting can be received and the process proceeds to S34.

In the S34 process, the microcomputer 15 calculates the average value of frequency offset for the N batches stored in the internal memory. After that, the microcomputer 15 determines whether the average value (hereinafter referred to as the "average frequency offset") of the calculated frequency offset is included in the range (hereinafter referred to as the "range for analog average frequency offset") set for the average frequency offset of the analog radio broadcasting. If the average frequency offset is within the range for analog average frequency offset (S34: YES), the microcomputer 15 determines that the analog radio broadcasting can be received stably as the noise influence is continuously low. The process thereafter proceeds to S36. On the other hand, if the average frequency offset is outside the range for analog average frequency offset (S34: NO), the microcomputer 15 determines that the analog radio broadcasting cannot be received as the noise influence is high and the reception status is unstable. In this case, the "analog NG flag" is set to "1" (S35) and the process proceeds to S36.

In the S36 process, the microcomputer 15 determines whether the average frequency offset is included in the range (hereinafter referred to as the "range for digital average frequency offset") set for the average frequency offset of the digital radio broadcasting. If the average frequency offset is determined to be within the range for digital average frequency offset (S36: YES), the microcomputer 15 determines that the digital radio broadcasting can be received stably as the noise influence is continuously low. The process thereafter proceeds to S38. On the other hand, if the average frequency offset is determined to be outside the range for digital average frequency offset (S36: NO), the microcomputer 15 determines that the digital radio broadcasting cannot be received as the noise influence is high and the reception status is unstable. In this case, the "digital NG flag" is set to "1" (S37) and the process proceeds to S38.

Similar to the S11 process, in the S38 process too, the microcomputer 15 refers to the "analog NG flag" and "digital NG flag". When both of these flags are "1" (S38: YES), the microcomputer 15 determines that neither the analog radio broadcasting nor the digital radio broadcasting can be received. In this case, the process returns to S1 and the process for the frequency band for the next seeking operation is performed. On the other hand, if at least one of these flags is "0" (S38: NO), the microcomputer 15 determines that at least one radio broadcasting can be received and the process proceeds to S39.

In the S39 process, the microcomputer 15 calculates the average value of USN for the N batches stored in the internal memory. After that, the microcomputer 15 determines whether the average value (hereinafter referred to as the "average USN") of the calculated USN is less than the threshold value (hereinafter referred to as the "threshold value for the analog average USN") corresponding to the average USN of the analog radio broadcasting set in advance. If the average USN is less than the threshold value for the analog average USN (S39: YES), the microcomputer 15 determines that the analog radio broadcasting can be received as the influence of adjacent disturbance is continuously low. The process thereafter proceeds to S41. On the other hand, if the average USN is more than the threshold value for the analog average USN (S39: NO), the microcomputer 15 determines that the analog radio broadcasting cannot be received as the influence of adjacent disturbance is high and the reception status is unstable. In this case, the "analog NG flag" is set to "1" (S40) and the process proceeds to S41.

In the S41 process, the microcomputer 15 determines whether the average USN is less than the threshold value (hereinafter referred to as the "threshold value for the digital average USN") corresponding to the average USN of the digital radio broadcasting set in advance. If the average USN is less than the threshold value for the digital average USN (S41: YES), the microcomputer 15 determines that the digital radio broadcasting can be received as the influence of adjacent disturbance is continuously low. The process thereafter proceeds to S43. On the other hand, if the average USN is more than the threshold value for the digital average USN (S41: NO), the microcomputer 15 determines that the digital radio broadcasting cannot be received as the influence of adjacent disturbance is high and the reception status is unstable. In this case, the "digital NG flag" is set to "1" (S42) and the process proceeds to S43.

Similar to the S11 process, in the S43 process too, the microcomputer 15 refers to the "analog NG flag" and "digital NG flag". When both of these flags are "1" (S43: YES), the microcomputer 15 determines that neither the analog radio broadcasting nor the digital radio broadcasting can be received. In this case, the process returns to S1 and the process for the frequency band for the next seeking operation is performed. On the other hand, if at least one of these flags is "0" (S43: NO), the microcomputer 15 determines that at least one radio broadcasting can be received and the process proceeds to S44.

In the S44 process, the microcomputer 15 calculates the average value of MPN for the N batches stored in the internal memory. After that, the microcomputer 15 determines whether the average value (hereinafter referred to as the "average MPN") of the calculated MPN is less than the threshold value (hereinafter referred to as the "threshold value for the analog average MPN") corresponding to the average MPN of the analog radio broadcasting set in advance. If the average MPN is less than the threshold value for the analog average MPN (S44: YES), the microcomputer 15 determines that the analog radio broadcasting can be received as the influence of multipath noise is continuously low. The process thereafter proceeds to S46. On the other hand, if the average MPN is more than the threshold value for the analog average MPN (S44: NO), the microcomputer 15 determines that the analog radio broadcasting cannot be received as the influence of multipath noise is high and the reception status is unstable. In this case, the "analog NG flag" is set to "1" (S45) and the process proceeds to S46.

In the S46 process, the microcomputer 15 determines whether the average MPN is less than the threshold value (hereinafter referred to as the "threshold value for the digital average MPN") corresponding to the average MPN of the digital radio broadcasting set in advance. If the average MPN is less than the threshold value for the digital average MPN (S46: YES), the microcomputer 15 determines that the digital radio broadcasting can be received as the influence of multipath noise is continuously low. The process thereafter proceeds to S48. On the other hand, if the average MPN is more than the threshold value for the digital average MPN (S46: NO), the microcomputer 15 determines that the digital radio broadcasting cannot be received as the influence of multipath noise is high and the reception status is unstable. In this case, the "digital NG flag" is set to "1" (S47) and the process proceeds to S48.

Similar to the S11 process, in the S48 process too, the microcomputer 15 refers to the "analog NG flag" and "digital NG flag". When both of these flags are "1" (S48: YES), the microcomputer 15 determines that neither the analog radio broadcasting nor the digital radio broadcasting can be received. In this case, the process returns to S1 and the process for the frequency band for the next seeking operation is performed. On the other hand, if at least one of these flags is "0" (S48: NO), the microcomputer 15 determines that at least one radio broadcasting can be received and the process proceeds to S50.

In the S50 process, the microcomputer 15 decrements the count value M by 1 and then determines whether the count value M is "0" (S51). If the count value M is "0" (S51: YES), the microcomputer 15 determines that the frequency band for which seeking operation is performed is station-existent as a result of repeating the Steps 4-50 processes M times. The process thereafter proceeds to S52. On the other hand, when the count value M is not "0" (S51: NO), the microcomputer 15 determines that the Steps 4-50 processes are not performed M times. The acquired quality information as well as each average value (average receiving intensity, average frequency offset, average USN and average MPN) of the quality information stored in the internal memory is deleted (S49) and the process returns to S4.

In the S52 process, the microcomputer 15 determines whether the "analog NG flag" is "0". When the "analog NG flag" is "0" (S52: YES), the microcomputer 15 determines that the frequency band for which seeking operation is performed is the analog radio broadcasting or hybrid broadcasting (broadcasting that includes analog as well as digital radio broadcasting). In addition to this, it is ascertained that the analog radio broadcasting is included in the frequency band. After that, the channel seeking operation is stopped (i.e., this flow chart is ended) with the frequency band selected. Thereby, the analog radio broadcasting of the selected channel is played at the speaker 13. It is also possible to switch to the digital radio broadcasting of the selected channel by performing the prescribed user operation.

In the S52 process, the microcomputer 15 calculates the difference A between "maximum frequency offset" and "minimum frequency offset" when it is determined (S52: NO) that "analog NG flag" is not "0" (i.e., "digital NG flag" is "0"). After that, the microcomputer 15 also determines (S53) whether the calculated difference A is greater than or equal to the prescribed threshold value B.

In the S53 process, when the difference A is determined to be less than the threshold value B (S53: NO), the microcomputer 15 determines that the frequency band for which seeking operation is performed includes an extremely weak analog radio broadcasting or does not include any other type of radio broadcasting. The process then returns to S1 and the process for the frequency band for the next seeking operation is performed.

In the S53 process, when the microcomputer 15 determines (S53: YES) that the difference A is greater than or equal to the threshold value B, it is determined that the frequency band for which seeking operation is performed is most probably a channel that includes only the digital radio broadcasting. Then, the decoding process is performed by controlling the IDM 16. If IBOC signal (i.e., identification information which indicates that it is a digital radio broadcasting) is obtained (S54: YES) by this decoding process, the microcomputer 15 ascertains that the frequency band for which seeking operation is performed is the channel that includes only the digital radio broadcasting. The channel seeking operation is stopped (i.e., this flowchart is ended) with the frequency band selected.

Thereby, the digital radio broadcasting of the selected channel is played at the speaker 13. When IOBC signal is not obtained (S54: NO) by the above-mentioned decoding process, the microcomputer 15 determines that the frequency band for which seeking operation is performed does not include any kind of radio broadcasting. In this case, the process returns to S1 and the process for the frequency band for the next seeking operation is performed.

In other words, depending on the audio apparatus 100 of the present embodiment, the determination process is performed by using the quality information of the frequency band for which the seeking operation is performed. The decoding process by the IDM 16 is performed only for the broadcasting that is determined to be most probably a digital radio broadcasting. Thereby, the channel seeking operation can be performed with a high accuracy and the decoding process performed by means of IDM 16 is not performed in vain. As a result, it is possible to decrease the time required for the channel seeking operation. In addition, by obtaining the frequency offset ("maximum frequency offset" and "minimum frequency offset") and using it in the prescribed determination process, it is also possible to determine whether the frequency band that is determined to be station-existent is a channel that includes only the digital radio broadcasting or is noise, etc.

The embodiments of the present invention are as described in the above. The present invention is not limited only to these embodiments but can be changed in various ranges. For example, although the audio apparatus 100 comprising the IBOC broadcasting receiver of the present embodiment is equipped in a vehicle, it may be a portable appliance that a person can carry in other embodiments.

What is claimed is:

1. A broadcasting receiver suitable for receiving a broadcasting signal of a base station transmitted in a signal format in which a carrier wave is allocated in a frequency channel to have a certain frequency offset relative to a center of frequency of the frequency channel and to have a certain signal intensity, the broadcasting receiver comprising:

an information acquiring unit that acquires information related to the frequency channel being sought; and a station existence determining unit that determines based on the information acquired by the information acquiring unit, whether or not the frequency channel includes a broadcast station and, hence, is or is not in a state of station-existent wherein:

the information acquiring unit is configured to acquire, as the information related to the frequency channel, information concerning a receiving intensity of a carrier wave in the frequency channel and information concerning a frequency offset of the carrier wave in the frequency channel; and the station existence determining unit is configured to determine that the frequency channel is in the state of station-existent when the receiving intensity is larger than a predetermined threshold value and when the freauencv offset lies within a range set for the frequency offset.

2. The broadcasting receiver according to claim 1, wherein the broadcasting receiver is capable of receiving the broadcasting signal transmitted in a signal format in which a carrier wave of a digital broadcasting signal is allocated in the frequency channel to have a certain frequency offset and a certain signal intensity.

3. The broadcasting receiver according to claim 2, wherein: the digital broadcasting signal is transmitted in a format of Orthogonal Frequency Division Multiplexing (OFDM); and the carrier wave of the digital broadcasting signal is a subcarrier.

4. The broadcasting receiver according to claim 1, wherein the broadcasting receiver is capable of receiving the broadcasting signal transmitted in a signal format in which only the carrier wave of an analog broadcasting signal or both the carrier wave of the analog broadcasting signal and the carrier wave of a digital broadcasting signal are allocated in the frequency channel to have a certain frequency offset and a certain signal intensity.

5. The broadcasting receiver according to claim 1, wherein the information acquiring unit further acquires at least one of information concerning adjacent disturbance and information concerning multipath noise.

6. The broadcasting receiver according to claim 1, further comprising an analog determining unit that determines whether the carrier wave of the analog broadcasting signal is included in the frequency channel or not, based on the information acquired by the information acquiring unit.

7. The broadcasting receiver according to claim 6, further comprising: a difference calculating it unit that calculates difference between a maximum value and a minimum value of the frequency offset of the carrier wave included in the frequency channel based on the information of frequency offset acquired by the information acquiring unit; and an all-digital determining unit that determines whether the broadcasting signal in the all-digital format that is the signal format including only the carrier wave of the digital broadcasting signal is transmitted in the frequency channel or not, wherein the all-digital determining unit determines that the broadcasting signal in the all-digital format is transmitted in the frequency channel, when the station existence determining unit determines that the frequency channel is in the state of station-existent, the analog determining unit determines that the frequency channel does not include the carrier wave of the analog broadcasting signal, and the difference calculated by the difference calculating unit is larger than or equal to a certain value.

8. The broadcasting receiver according to claim 7, wherein the difference calculating unit performs calculation of the difference when the station existence determining unit determines that the frequency channel is in the state of station-existent, and the analog determining unit determines that the frequency channel does not include the carrier wave of the analog broadcasting signal.

9. The broadcasting receiver according to claim 7, further comprising: a decoding unit that decodes the digital broadcasting signal; and an all-digital ascertaining unit that ascertains that the broadcasting signal in the all-digital digital format is transmitted in the frequency channel, based on the result of the decoding process by the decoding unit, wherein in the channel seek, the decoding process is performed by the decoding unit only when the all-digital determining unit determines that the broadcasting signal in the all-digital format is transmitted in the frequency channel.

10. The broadcasting receiver according to claim 1, further comprising a digital determining unit that determines whether carrier wave of the digital broadcasting signal is included in the frequency channel or not, based on the information acquired by the information acquiring unit.

11. The broadcasting receiver according to claim wherein the broadcasting signal is a radio broadcasting signal.

12. The broadcasting receiver according to claim 1, wherein the signal format is an IBOC signal format.

13. The broadcasting receiver according to claim 1, wherein the broadcasting receiver is capable of being mounted on a mobile unit.

14. A method for performing channel seek for a frequency channel, wherein a broadcasting signal of a base station in a signal format in which a carrier wave of an analog broadcasting signal and/or a digital broadcasting signal is allocated to have a certain frequency offset relative to a center of frequency of the frequency channel and to have a certain signal intensity is transmitted in the frequency channel, the method comprising:

an information acquiring step of acquiring information related to the frequency channel being sought; and a station existence determining step of determining based on the information acquired by the information acquiring step, whether or not the frequency channel includes a broadcast station and, hence, is or is not in a state of station-existent wherein:

the information acquiring step comprises acquiring, as the information related to the frequency channel, information concerning a receiving intensity of a carrier wave in the frequency channel and information concerning a frequency offset of the carrier wave in the frequency channel; and the station existence determining step comprises determining whether the frequency channel is in the state of station-existent when the receiving intensity is larger than a predetermined threshold value and when the frequency offset lies within a range set for the frequency offset.

15. The method for performing channel seek according to claim 14, wherein in the information acquiring step, at least one of information concerning adjacent disturbance and information concerning multipath noise is acquired.

16. The method for performing channel seek according to claim 14, further comprising an analog determining step of determining whether the carrier wave of the analog broadcasting signal is included in the frequency channel or not, based on the information acquired in the information acquiring step.

17. The method for performing channel seek according to claim 16, further comprising: a difference calculating step of calculating difference between a maximum value and a minimum value of the frequency offset of the carrier wave included in the frequency channel based on the information of the frequency offset acquired in the information acquiring step; and an all-digital determining step of determining whether the broadcasting signal in the all-digital format that is a signal format that includes only the carrier wave of the digital broadcasting signal is transmitted in the frequency channel or not, wherein in the all-digital determining step, it is determined that the broadcasting signal in the all-digital format is transmitted in the frequency channel, when it is determined that the frequency channel is in the state of station-existent in the station existence determining step, and that the frequency channel does not include the carrier wave of the analog broadcasting signal in the analog determining step, and the difference calculated in the difference calculating step is larger than or equal to a certain value.

18. The method for performing channel seek according to claim 17, wherein: in the difference calculating step, calculation of the difference is performed when, it is determined that the frequency channel is in the state of station-existent in the station existence determining step, and that the frequency channel does not include the carrier wave of the analog broadcasting signal in the analog determining step.

19. The method for performing channel seek according to claim 17, further comprising: a decoding step of decoding the digital broadcasting signal; and an all-digital ascertaining step of ascertaining that the broadcasting signal in the all-digital digital format is transmitted in the frequency channel, based on the result of the decoding process in the decoding step, wherein in the channel seek, the decoding process in the decoding step is performed only when it is determined that the broadcasting signal in all-digital format is transmitted in the frequency channel in the all-digital determining step.

20. The method for performing channel seek according to claim 14, further comprising a digital determining step of determining whether the carrier wave of the digital broadcasting signal is included in the frequency channel or not, based on the information acquired in the information acquiring step.

21. The method for performing channel seek according to claim 14, wherein the broadcasting signal is a radio broadcasting signal.

22. The method for performing channel seek according to claim 14, wherein the signal format is an IBOC signal format.

* * * * *